United States Patent
Yao et al.

(10) Patent No.: US 8,280,992 B2
(45) Date of Patent: Oct. 2, 2012

(54) METHOD FOR CONFIGURING NODES WITHIN ANYCAST GROUP, AND ASSISTANCE METHOD AND DEVICE THEREFOR

(75) Inventors: Chunyan Yao, Shanghai (CN); Yinglan Jiang, Shanghai (CN); Haibo Wen, Shanghai (CN)

(73) Assignee: Alcatel Lucent, Paris (FR)

( * ) Notice: Subject to any disclaimer, the term of this patent is extended or adjusted under 35 U.S.C. 154(b) by 326 days.

(21) Appl. No.: 12/448,605

(22) PCT Filed: Jul. 3, 2007

(86) PCT No.: PCT/CN2007/002063
§ 371 (c)(1),
(2), (4) Date: Jun. 26, 2009

(87) PCT Pub. No.: WO2008/080279
PCT Pub. Date: Jul. 10, 2008

(65) Prior Publication Data
US 2010/0074144 A1    Mar. 25, 2010

(30) Foreign Application Priority Data
Dec. 29, 2006    (CN) .................. 2006 1 0148328

(51) Int. Cl.
    H04L 12/28    (2006.01)
(52) U.S. Cl. ........ 709/222; 709/203; 709/205; 709/245; 370/254
(58) Field of Classification Search ................ 709/222, 709/245, 203, 205; 370/329
    See application file for complete search history.

(56) References Cited

U.S. PATENT DOCUMENTS

| | | | |
|---|---|---|---|
| 6,443,891 B1 * | 9/2002 | Grevious | 600/302 |
| 6,480,849 B1 * | 11/2002 | Lee et al. | 1/1 |
| 6,490,622 B1 * | 12/2002 | Nagami et al. | 709/225 |
| 7,254,636 B1 * | 8/2007 | O'Toole et al. | 709/230 |
| 2002/0083174 A1 * | 6/2002 | Hayashi et al. | 709/225 |
| 2005/0105475 A1 * | 5/2005 | Norrgard et al. | 370/254 |
| 2005/0249140 A1 * | 11/2005 | Lee et al. | 370/312 |
| 2006/0248158 A1 * | 11/2006 | Ha et al. | 709/208 |
| 2007/0076724 A1 * | 4/2007 | Hall et al. | 370/395.52 |
| 2008/0120431 A1 * | 5/2008 | Chun | 709/238 |

OTHER PUBLICATIONS

European Search Report dated Mar. 16, 2011 in corresponding European Patent Application No. 07721623.2.
D.Farinacci et al., "Anycast-RP Using Protocol Independent Multicast(PIM)," Cisco Systems, Aug. 2006.
Yao, Chunyan. Anycast RP auto-conficguration <draft-yao-pim-anycast-rp-autoconfiguration-00.text>. Internet Engineering Task Force, Internet-Draft, Mar. 2007, XP015050600A.
B. Cain et al., "Internet Group Management Protocol, Version 3," Cisco Systems, Oct. 2002, XP15009135A.
Metz, Chris. "IP Anycast: Point-to-(Any) Point Communication." IEEE Internet Computing, Mar.-Apr. 2002, pp. 94-98, XP11094338A.

* cited by examiner

*Primary Examiner* — Wing Chan
*Assistant Examiner* — Tesfay Yahannes
(74) *Attorney, Agent, or Firm* — Harness, Dickey & Pierce, P.L.C.

(57) ABSTRACT

A method for configuring, in a preset node within an anycast group, non-preset nodes within the group and a control device therefor are provided. The method comprises: generating one or more address configuration messages based on the predetermined configuration address information; and sending to each of non-preset nodes within the anycast group the address configuration message corresponding to the non-preset node. A method for assistant configuration of non-preset nodes within an anycast group and an assistance control device therefor are also provided.

26 Claims, 8 Drawing Sheets

METHOD FOR CONFIGURING NODES WITHIN ANYCAST GROUP, AND ASSISTANCE METHOD AND DEVICE THEREFOR

FIELD OF THE INVENTION

The present invention relates to an anycast group, and in particular relates to a method and device for automatically configuring each member node within an anycast group.

BACKGROUND OF THE INVENTION

The Internet protocol version 6 (IPv6) supports three transmission modes: Unicast, Multicast, and Anycast. The IPv6 protocol includes three kinds of addresses associated with a network device: unicast address, multicast address, and anycast address. Anycast is a communication mode where any sender corresponds to any receiver closest to the sender among several receivers in a topology structure. In contrast, multicast is a communication mode where a single sender corresponds to a set of selected receivers, whereas unicast is a communication mode where a single sender corresponds to a single receiver. In a routing process, the IPv6 protocol does not differentiate the unicast and anycast addresses. When responding to an anycast data packet, the node receiving the anycast data packet needs to take its own unicast address as the sender address in the header.

An IPv6 protocol-based anycast mechanism sets an identical anycast address to servers or other network devices with the same functions, namely the group address of the anycast group. With this solution, a message can directly reach a closest server or other network device, and at this time, if the message is also required to further forward to other anycast group members by the server or other network device, then the server or other network device in this connection is called a master node, and other anycast group members are called slave nodes. Here, the mast node and slave nodes are not equal therebetween. Correspondingly, if the message sent by a counterpart node (for example a sender) communicating with an anycast group to the anycast group is not required to be further forwarded to other nodes so long as it reaches any node (member) in the anycast group, then there is no differentiation between a mast node and slave nodes among the anycast group nodes. For example in consideration of load balance, there would be more than one register servers. By sending a register request message by a subscriber proxy to a preset universal address of all register services (for example an anycast group address), with the anycast mechanism, a closest server in the network will respond to the request, thereby the load balance problem can be effectively solved. It will be understood that during a communication process between a node and other nodes within an anycast group, each node in the anycast group can be a master node, dependent on which node within the group to be closest to the sender.

Currently, some applications of anycast (for example rendezvous point anycast group in a multicast routing device) have been widely supported by router vendors, where in an anycast group, each node is configured with the group address of the anycast group and the addresses of all member nodes (for example a router) in the anycast group. These configurations are prerequisite for normal operation of the anycast group. Till now, each node of an anycast group has always been configured manually, for example when a network integrator sells multiple content servers to a network content vendor and it requires anycast group configuration to these content servers, the field workers of the network integrator will configure the content servers one by one manually. If the number of anycast group members is more than 1, manual configuration of anycast group information is prone to inconstancy, which can cause connectivity problem, especially when the addresses are IPv6 addresses (since the addressed prescribed in the IPv6 are rather complex) or the members of the anycast group change (for example some new members need to be added in the anycast group or some old members need to be removed from the anycast group).

Apparently, there is a need to change the prevailing mode of manually configuring anycast group member nodes.

SUMMARY OF THE INVENTION

An objective of the present invention is to provide a solution of automatically configuring an anycast group in view of the above problem in the prior art.

According to an aspect of the present invention, there is provided a method for configuring, in preset nodes within an anycast group, non-preset nodes within the group, comprising a step of automatically performing address configuration of the non-preset nodes within the group based on predetermined configuration address information.

Preferably, the above-mentioned step of automatically performing address configuration of the non-preset nodes within the group based on predetermined configuration address information comprises the following steps: a. generating one or more address configuration messages based on the predetermined configuration address information; b. sending to each of the non-preset nodes within the anycast group the address configuration message corresponding to the non-preset node.

According to another aspect of the present invention, there is provided a control device for configuring non-preset nodes within the group in preset nodes within an anycast group, wherein the addresses of non-preset nodes within the group are automatically configured based on predetermined configuration address information. The control device comprises: first generating means for generating one or more address configuration messages based on the predetermined configuration address information; and first sending means for sending to each of the non-preset nodes within the anycast group the address configuration message corresponding to the non-preset node.

According to further aspect of the present invention, there is provided a method for assistant configuration of non-preset nodes within an anycast group, comprising a step of automatically performing address configuration based on an address configuration message or address configuration update message from a preset node within the anycast group.

Preferably, the above-mentioned step of automatically performing address configuration based on an address configuration message or address configuration update message from a preset node within the anycast group comprises the following steps: i. receiving an address configuration message or address configuration update message from the preset node; ii. configuring the present node based on the address configuration message or the address configuration update message.

According to still further aspect of the present invention, there is provided an assistant control device for assistant configuration in non-preset nodes within an anycast group, comprising: second receiving means for receiving an address configuration message or an address configuration update message from a preset node within the anycast group; and configuration processing means for configuring the present node based on the address configuration message or the address configuration update message.

According to yet further aspect of the present invention, there is provided a node within an anycast group, wherein the node comprises the above-mentioned control device and/or the above-mentioned assistant control means, and wherein the node may comprise one or more of a routing device, a switch device and a host machine.

The above-mentioned anycast group can be an anycast group defined based on an IP network protocol, but it does not exclude an anycast group defined by other protocols appearing in the future.

The technical solution provided by the present invention significantly reduces potential inconsistency error during the process of configuring each node within an anycast group and reduces workload in the network administration and network maintenance. The present solution can directly bring configuration convenience to relevant users and provide multicast routers with higher maintainability.

BRIEF DESCRIPTION OF THE DRAWINGS

Other features, purposes and advantages of the present invention would be more apparent through reading the following detailed description of the non-limitation embodiments with reference to the accompanying drawings, wherein.

DETAILED DESCRIPTION OF THE PREFERRED EMBODIMENTS

Figure 1:
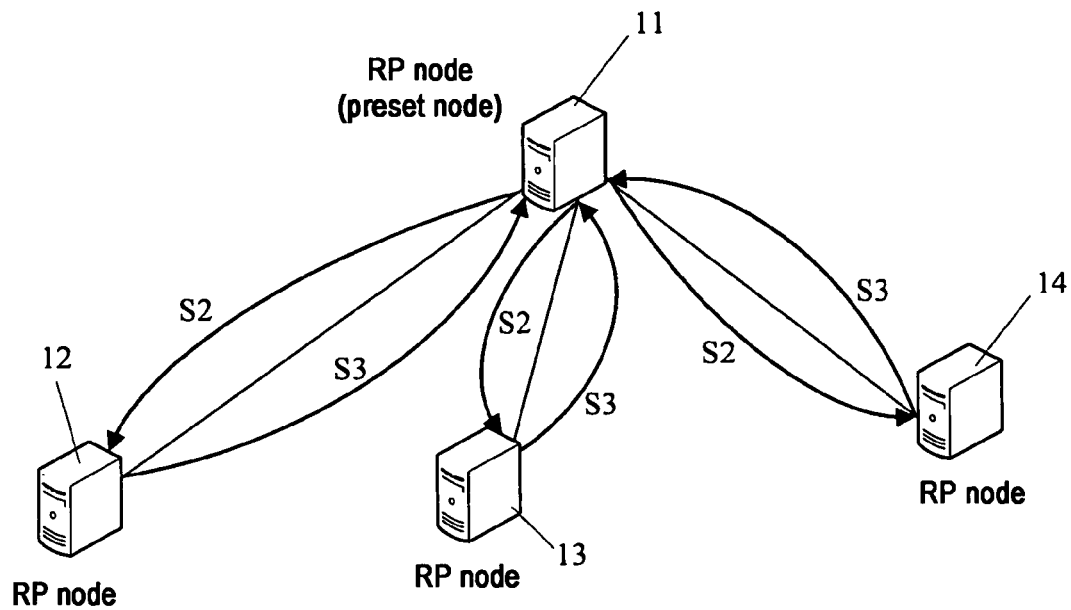
FIG. 1 shows a diagram of an automatic configuring process for non-preset nodes within an anycast group according to an embodiment of the present invention.

With reference to FIG. 1, it shows a diagram of an automatic configuring process for preset nodes within an anycast group according to an embodiment of the present invention. In the present embodiment, for the sake of description, an anycast group of a multicast communication network only comprises four nodes, and besides these nodes are all rendezvous points (RP), but the skilled in the art would appreciate that these nodes can also be non-RP nodes, for example transitional device (4-6 relay router) nodes (for example DNS root server) from IPv4 to IPv6. In the present embodiment, the above-mentioned four RPs 11, 12, 13, 14 are interconnected, but for the sake of description, only the connections between the preset node 11 and RP node 12, RP node 13 and RP node 14 are shown. The skilled in the art would appreciate that the connections between these nodes can be either wireless or cabled, which does not affect the substantive content of the present invention. The preset node firstly obtains configuration address information (this step is not shown in the figure), the configuration address information includes all necessary information for configuring the anycast group. The skilled in the art would understand that, the information includes for example a group address of the anycast group and address information about all nodes inside the anycast group (not only includes the address information of the preset node per se, but also address information of the non-preset nodes). Then, based on the configuration address information, the preset node generates one or more address configuration messages (this step is not shown in the figure). The skilled in the art understand that, the number of the address information messages corresponds to the number of non-preset nodes, for example in the present embodiment, there are three non-preset to nodes except the preset node 11, i.e. RP nodes 12, 13, 14, thus the preset node generates three address configuration messages respectively corresponding to three non-preset nodes. In the present embodiment, the above address configuration message includes the group address of the anycast group and the address information of all nodes within the anycast group, and meanwhile the packet header of the address configuration message includes the address information corresponding to a non-preset node (for example RP node 12) to which the address configuration message should be sent, thus the address configuration message can be sent to a corresponding non-preset node (for example RP node 12) through the communication network where the anycast group is in. The skilled in the art would understand that, the above address configuration message can also include other contents, for example the name identification of the present node (member) and the service capability parameters (for example the utmost number of connections capable of being provided at the same time) by the present node in case of a server, and the other contents can be determined by the skilled in the art based on the specific requirements of the anycast communication network configuration and the specific situation of the implementation, which will not be detailed here.

Referring still to FIG. 1, the skilled in the art should appreciate that the above preset node refers to the node which firstly obtains the configuration address information and then actively configures other nodes (slave nodes) based on the content of the present invention, which can be understood by the skilled in the art, and is thus not detailed here.

With reference to FIG. 1, after generating the corresponding address configuration message, step S2 is implemented, namely the preset node 11 sends these address configuration messages respectively to the corresponding non-preset nodes (i.e. RP node 12, RP node 13 and RP node 14). After the corresponding non-preset nodes receive the corresponding address configuration messages, corresponding configuration is performed based on the address configuration messages (this step is not shown in the figure), and then step S3 is implemented, namely sending a configuration result answer message to the preset node 11. By far, the major work for the preset node to automatically configure the non-preset nodes within the anycast group has been completed. Then, the preset node 11 performs other processing based on the above configuration result answer message (this step is not shown in the figure), which will be detailed in the following embodiment.

Figure 2:
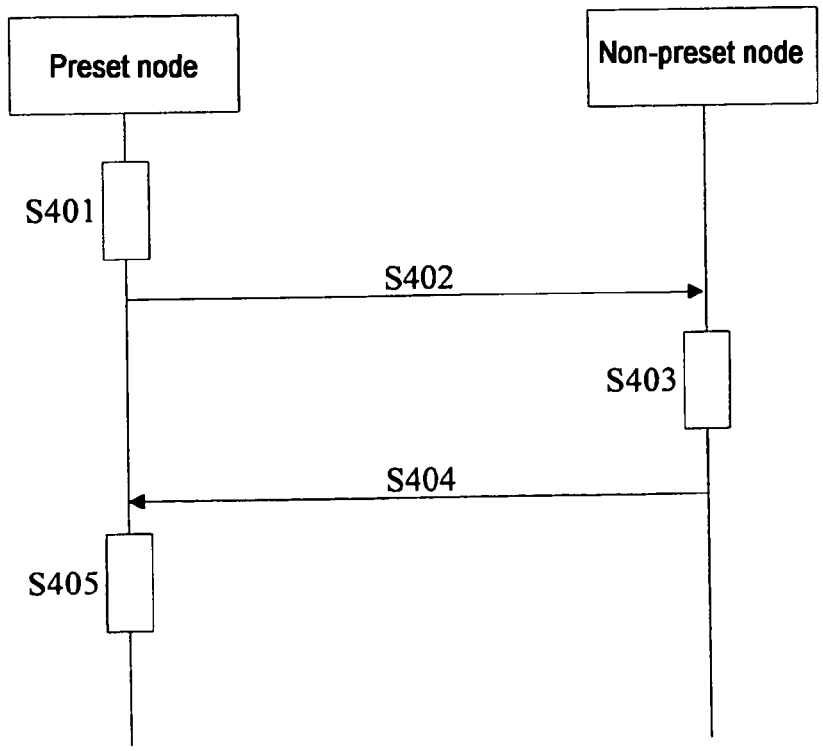
FIG. 2 shows a timing diagram of initially configuring non-preset nodes by a preset node within an anycast group according to the first embodiment of the present invention.

With reference to FIG. 2, it shows a timing diagram of initially configuring non-preset nodes by the preset node within an anycast group according to the first embodiment of the present invention. Firstly, step S401 is implemented, where the preset node obtains a predetermined configuration address information; and then the preset node generates one or more address configuration messages based on the configuration address information; then step S402 is implemented, where the preset node sends to each non-preset node within the anycast group the address configuration message corresponding to the non-preset node; after a non-preset node receives the corresponding address configuration message, step S403 is implemented, i.e. configuring the present node based on the address configuration message; upon completion of the configuration, step S404 is implemented, i.e. returning a configuration result answer message to the preset node; after the preset node receives the corresponding configuration result answer message, step S405 is implemented, i.e. processing these messages, and till now the present configuration process ends.

With reference to FIG. 2, the skilled in the art would appreciate that, at the step S403 of the present embodiment as described above, a non-preset node implements the following step to complete the process of self configuration based on the address configuration message, namely saving the addresses for all nodes (including the preset node) other than the present non-preset node within the anycast group to communicate with the present node, as contained in the address configuration message, to be correlated with the group address of the anycast group contained in the address configuration message. The skilled in the art would appreciate that this step can be completed by setting the above address information into a configuration information table (or other similar object) regarding the anycast group which is accessible by the above non-preset node, or by other similar manner, which will not be detailed here.

With reference to FIG. 2, the skilled in the art would further appreciate that, the address information contained in the above address configuration message can include the group address of the anycast group and respective address of all nodes within the anycast group. In the present embodiment, the respective addresses of such nodes are all unicast addresses, whereas in a variation of the present embodiment, they can also be other address information. The skilled in the art would appreciate that the precondition for mutual communication between each node of an anycast group is that each node is capable of communicating with other nodes, and in a preferred embodiment, mutual communication can be implemented through respective network address, for example the above mentioned unicast address. Thus, the address, so long as it can guarantee mutual communication between each node within the anycast group, is applicable to the present invention.

Figure 3:
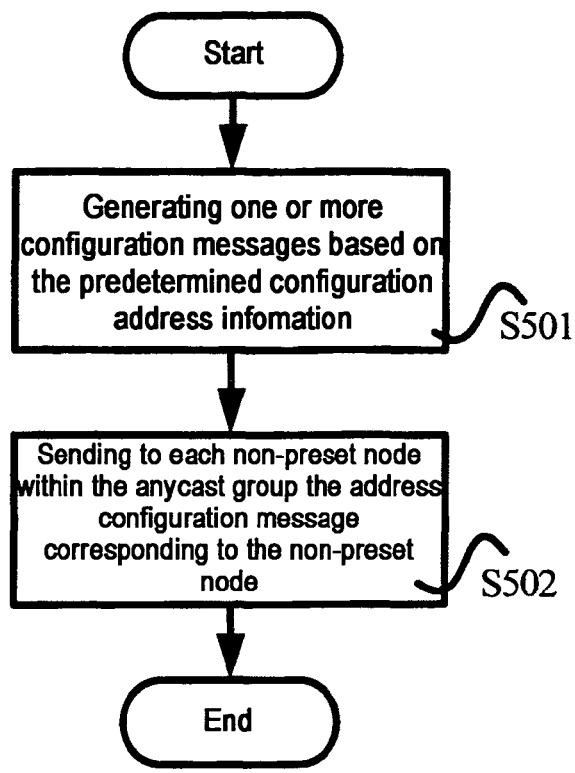
FIG. 3 shows a flow diagram of configuring non-preset nodes by the preset node within an anycast group according to the first embodiment of the present invention.

Still referring to FIG. 3, it shows a flow diagram for configuring non-preset nodes by the preset nodes within an anycast group according to the first embodiment of the present invention. Firstly, step S501 is implemented, where the preset node generates one or more address configuration messages based on the predetermined configuration address information; and then step S502 is implemented, where the preset node sends to each non-preset node within an anycast group the address configuration message corresponding to the non-preset node. The skilled in the art would appreciate that, the flow as shown in FIG. 3 does not include a step of processing the answer message returned by the non-preset node, but the preset node can process the above answer message. And the skilled in the art would understand and implement the step, for example step S405 as shown in FIG. 2.

Figure 4:
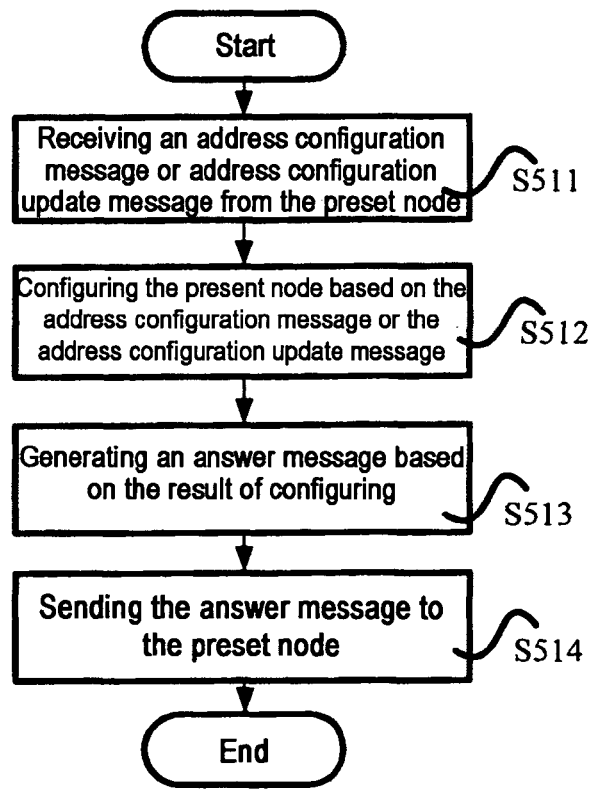
FIG. 4 shows a flow diagram of configuring after the non-preset nodes within an anycast group receives the address configuration message or the address configuration update message according to the first embodiment of the present invention.

Still referring to FIG. 4, it shows a flow for configuring after the non-preset nodes within an anycast group receives the address configuration message or the address configuration update message according to the first embodiment of the present invention. Firstly, step S511 is implemented, where a non-preset node receives the address configuration message or the address configuration update message from the preset node; then the flow goes to step S512, where the non-preset node configures itself based on the address configuration message or the address configuration update message; and then the flow goes to step S513, where the non-preset node generates an answer message based on the configuration result; and finally, step S514 is implemented, where the non-preset node sends the answer message to the preset node.

The skilled in the art would appreciate that, the figure of FIG. 4 is not only applicable for the preset node to initially configure the non-preset nodes, but also applicable for the preset node to update configuration of the non-preset nodes. In case of initial configuration, a non-preset node receives the address configuration message from the preset node, then it is configured based on the address configuration message, for example this configuration can be implemented according to step S403 as shown in FIG. 2; in case of update configuration, the non-preset node receives the address configuration update message from the preset node, then it correspondingly performs update configuration based on the address configuration update message. The specific operation can be implemented for example with reference to the embodiment as shown in the following FIG. 5. Similarly, the skilled in the art would appreciate that, the address configuration message as shown in steps S501 and S502 of FIG. 3 can be an address configuration message during the above-mentioned initial configuration or an address configuration update message during the update configuration.

Figure 5:
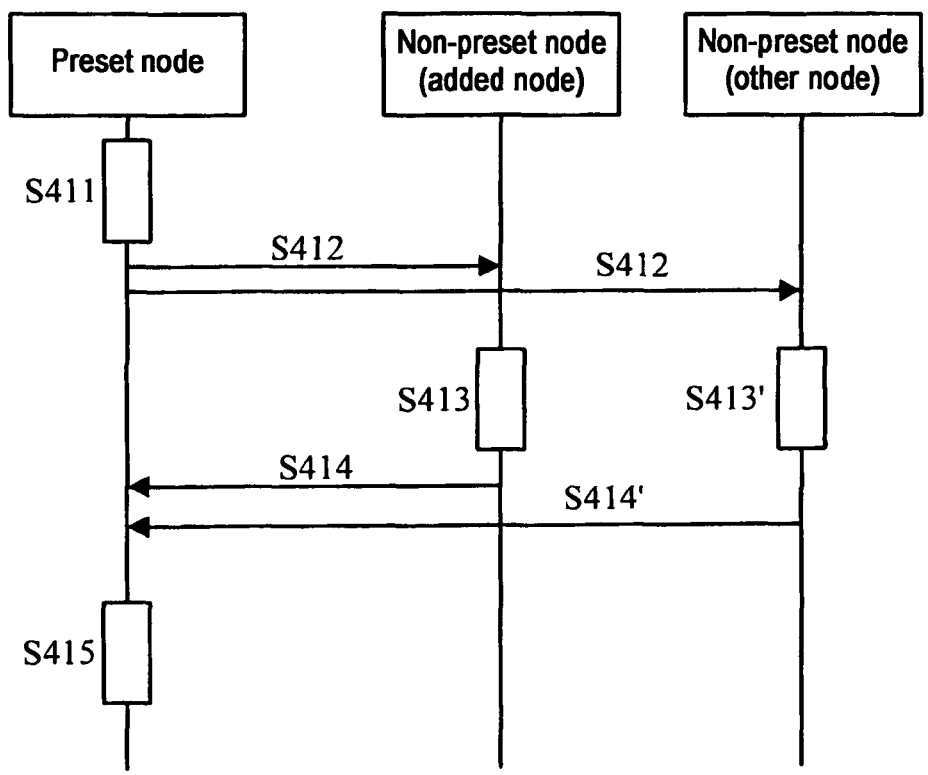
FIG. 5 shows a timing diagram of updating configuration by preset nodes within an anycast group in case of newly adding nodes according to the first embodiment of the present invention, wherein the preset nodes are nodes other than the added nodes.

With reference to FIG. 5, it shows a timing diagram of updating configuration performed by the preset nodes within an anycast group in case of newly adding nodes according to the first embodiment of the present invention. In the present embodiment, the preset node is not the added node. Firstly, step S411 is implemented; where the preset node obtains the predetermined configuration address information; then the preset node generates one or more address configuration update messages based on the configuration address information; then step 412 is implemented, where the preset node sends to each of non-preset nodes within an anycast group the address configuration message corresponding to the non-preset node, these non-preset nodes not only comprising the above newly added nodes but also other nodes already existing in the anycast group; after the above added nodes receive the corresponding address configuration update message, step S413 is implemented, i.e. configuring the present node based on the address configuration message, where the configuration process is identical to the initial configuration process of a non-preset node, for example step S403 as shown in FIG. 2; after the above other nodes receive the corresponding address configuration update messages, step S413' is implemented, i.e. updating configuration of the present node based on the address configuration update messages; upon completion of the above configurations, the newly added nodes and other nodes return a configuration result answer message to the preset node, i.e. respectively implementing steps S414, S414'; after the preset node receives the corresponding configuration result answer messages from the added nodes and other nodes respectively, step S405 is implemented, i.e. processing these messages, and till now, this configuration process ends.

The skilled in the art would appreciate that the configuration result answer messages as returned in the above steps S414, S414' can be identical, for example the configuration result answer messages as described in step S404 as shown in FIG. 2, or different, for example the configuration result answer message as returned at step S414 is identical to the configuration result answer message as described at step S404 as shown in FIG. 2, whereas the configuration result answer message as returned at step S414' includes a domain representing "update", which indicates that the answer message is for updating configuration. The skilled in the art can adopt different embodiments dependent on different implementation requirements, which does not affect the substantive content of the present invention.

The skilled in the art would appreciate that the step of configuring the present node in the above step S413' can only perform update configuration. Since one or more nodes are added in the present embodiment, the other nodes within the anycast group can add the address information of the added nodes to the configuration information table (or other similar object) regarding the anycast group, thereby completing the present update configuration. In a variation of the present embodiment, at step S413', other node originally present in the anycast group can also re-configure all information in the initial configuration manner, i.e. clearing the original configuration information table and recording address information of all nodes currently included within the anycast group in the configuration information table, for example as shown in step S403 in FIG. 2. The skilled in the art can adopt different embodiments dependent on different implementation requirements, which does not affect the substantive content of the present invention.

The skilled in the art would also appreciate that the above address configuration update information has varieties of implementation. In the present embodiment, the address configuration update information sent to the added nodes and to other nodes is identical, i.e. at least comprising the group address of the anycast group, the addresses of all nodes originally present within the anycast group, and the update address information (for example the addresses of the added nodes). In a variant example, the address configuration update information sent to the added nodes and to other nodes is also identical, i.e. at least comprising the group address of the anycast group, the addresses of all nodes currently present within the anycast group (i.e. updated addresses of all nodes). In this variant example, at step S413', configuration of other nodes can be updated directly or by comparing the changed address information. Whereas in another variant example, the address configuration update information sent to the added nodes at least comprises the group address of the anycast group, address information of all nodes (which may include the added nodes) currently within the anycast group; and the address configuration update information sent to other nodes only comprises the updated address information (for example the addresses of the added nodes), and at this time the address configuration update information sent to the two different nodes is different.

Figure 6:
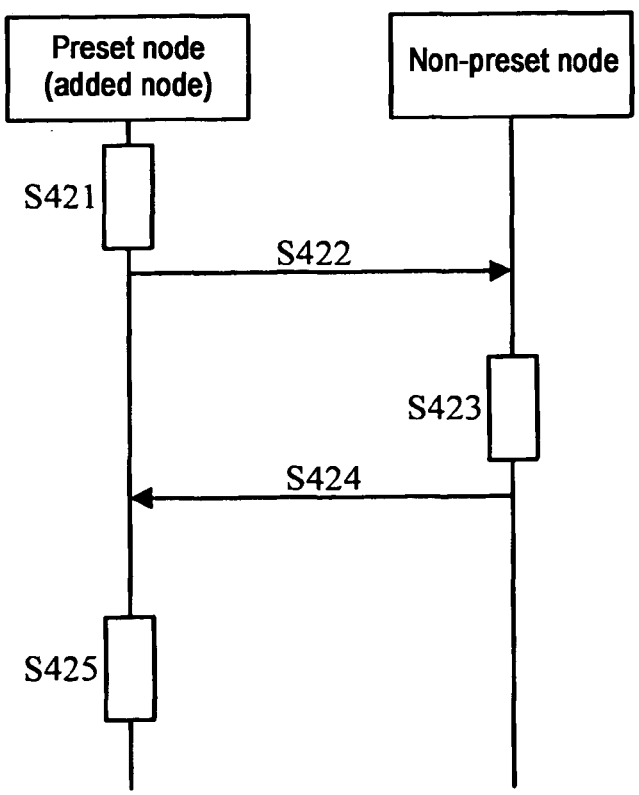
FIG. 6 shows a timing diagram of updating configuration by preset nodes within an anycast group in case of newly adding nodes according to the second embodiment of the present invention, wherein the preset nodes are the added node.

With reference to FIG. 6, it shows a timing diagram of updating configuration performed by preset nodes within an anycast group in case of newly adding nodes according to the second embodiment of the present invention. What is different from the first embodiment as shown in the above FIG. 5 is that the preset node in the present embodiment is the added node. Similarly, step S421 is firstly implemented, where the preset node obtains the predetermined configuration address information; then the preset node generates one or more address configuration update messages based on the configuration address information; then step S422 is implemented, where the preset node sends to each non-preset node within the anycast group the address configuration update message corresponding to the non-preset node. After the non-preset node receives the corresponding address configuration update message, step S423 is implemented, namely configuring the present node based on the address configuration update message; upon completion of the configuration, step S424 is implemented, namely returning a configuration result answer message to the preset node; after receiving the corresponding configuration result answer message, the preset node implements step S425, namely processing these messages, and till now, this configuration process ends.

The skilled in the art would appreciate that, at step S423 of the present embodiment, the configuration manner varies with the received address configuration update message. In the present embodiment, the newly added node has completed self configuration based on the predetermined configuration address information obtained at step S421, thus the address configuration update message sent thereby only includes the updated address information, and therefore each non-preset node at step S423 directly performs update configuration operation. However, in a variation of the present embodiment, the address configuration update message sent by the preset node at least comprises information of all nodes currently within the anycast group, thus at step S423 each non-preset node performs reconfiguration operation, or the determination of newly added nodes are made based on the current information of all nodes and the information in the original configuration information able, and then performs update configuration to these newly added nodes. The skilled in the art can refer to the embodiment shown in FIG. 5 to realize different implementations, which will not be detailed here.

With reference to FIG. 5 and FIG. 6, the skilled in the art would appreciate that there are also other processing manners in the variations of the above embodiment, for example, in one variation, multiple new nodes are added at the same time in the anycast group, wherein one added node therein is the preset node, and at this time the skilled in the art can correspondingly implement an embodiment in this case with reference to the embodiments as shown in FIG. 5 and FIG. 6, which will not be detailed here.

Figure 7:
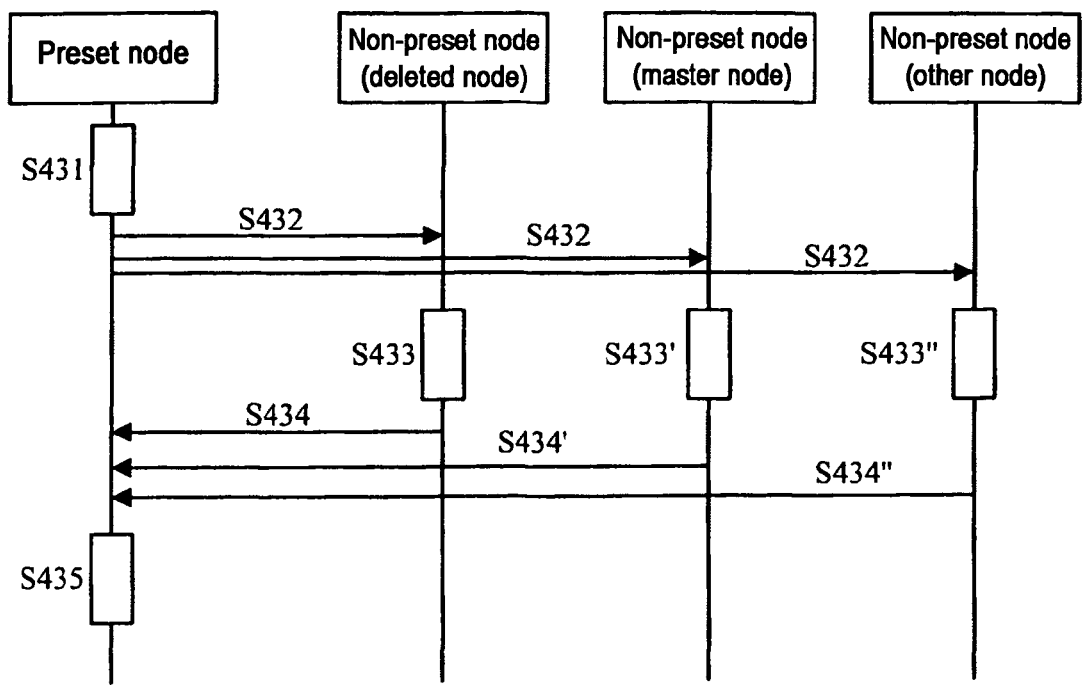
FIG. 7 shows a timing diagram of updating configuration by preset nodes within an anycast group in case of nodes being deleted from the anycast group according to the first embodiment of the present invention, wherein the preset nodes are nodes other than the deleted nodes.

With reference to FIG. 7, it shows a timing diagram of updating configuration performed by preset nodes within an anycast group in case of deleting nodes from the anycast group according to the first embodiment of the present invention. In the present embodiment, the preset node in the present embodiment is not a deleted node. In the present embodiment, steps S431 and S432 are similar to what is shown in FIG. 5, which can be implemented by the skilled in the art with reference to FIG. 5. In the present embodiment, the master node and slave nodes are differentiated in the anycast group, and at this time, after the deleted node, master node and other nodes originally existing within the anycast group receive the corresponding address configuration update messages, implement steps S433, S433' and S433" respectively. At step S433, the deleted node deletes the configuration information related to the anycast group in it, thereby it is no longer a member node of the anycast group; then, step S434 is implemented. At step S433', in one hand, the master node is required to determine whether the resource related to the deleted node in the master node is released, for example, whether a timer corresponding to the deleted node still runs (for example, in a RP node of PIM-SM (Protocol Independent Multicast-Sparse Mode), the timer is for calculating a time length, and the master node needs to determine whether register stop messages from other slave nodes are received during this period), and if the resource is not released yet, release the resource (for example deleting the timer). The skilled in the art would appreciate that the resource related to the deleted node can also be other resource (including hardware resource or software resource), for example a register or storage space. The register can be for recording the state information of the deleted node (slave node or slave member) or for other purposes, which can be implemented differently by the skilled in the art based on different applications of the anycast group; on the other hand, the master node is required to delete anycast configuration information related to the deleted node in it, for example deleting the address information of the deleted node, and for another example updating the number of the anycast group members, which will not be detailed here; and then step S434' is implemented. At step S433", other node deletes the anycast group configuration information related to the deleted node, for example deleting the address information of the deleted node, which can be understood and implemented by the skilled in the art and thus will be not detailed here; then step S434" is implemented. At steps S434, S434' and S434", each of the above-mentioned non-preset nodes (including the deleted node, the master node and the other node) returns a configuration result answer message to the preset node, and till now this configuration process ends.

Similar to the above-mentioned embodiments shown in FIG. 5 and FIG. 6, in the present embodiment, the above address configuration update information can also be implemented in varieties of ways. Preferably, the address configuration message only includes the updated address information, for example the address information of the deleted node. At this time, it just needs directly deleting relevant information of the deleted node based on the update information from the master node and other node. However, in another variant, the address configuration update message includes therein only the group address of the anycast group, the address information of all of the current nodes (all the updated nodes, i.e. not including the deleted node). At this time, each of the master node, other nodes and the deleted node can determine which node (s) are deleted by comparing the original address information of all nodes and the current information of all addresses, then the corresponding operation of update configuration is performed, or other nodes can perform update configuration after directly clearing the original configuration information table. The skilled in the art can implement other variant embodiment with reference to the embodiments as shown in FIG. 5 and FIG. 6.

With reference to FIG. 7, the skilled in the art would appreciate that when master node and slave node are differentiated in the anycast group, after a node in the anycast group receives the address configuration update message of deleting a node, the node will determine whether it per se is a master node based on the norm of the protocol, and if so, the update configuration operation is implemented based on the above operation process for the master node. Similarly, in the embodiment as shown in FIG. 7, the current non-preset node (i.e. the present node) is a master node, whereas when the deleted node is a slave node corresponding to the master node, the operation of releasing the resource relevant to the deleted slave node within the master node is implemented, as described in the above embodiment. Whereas in a variation of the above embodiment, the master node may not implement the operation of releasing relevant resource, and the skilled in the art would appreciate that such variation can still be implemented, which will not be detailed here.

With reference to FIG. 7, the skilled in the art would appreciate that if the above preset node is a master node, the update operation of deleting a node can be likewise implemented with reference to the above embodiment, which will not be detailed here.

Figure 8:
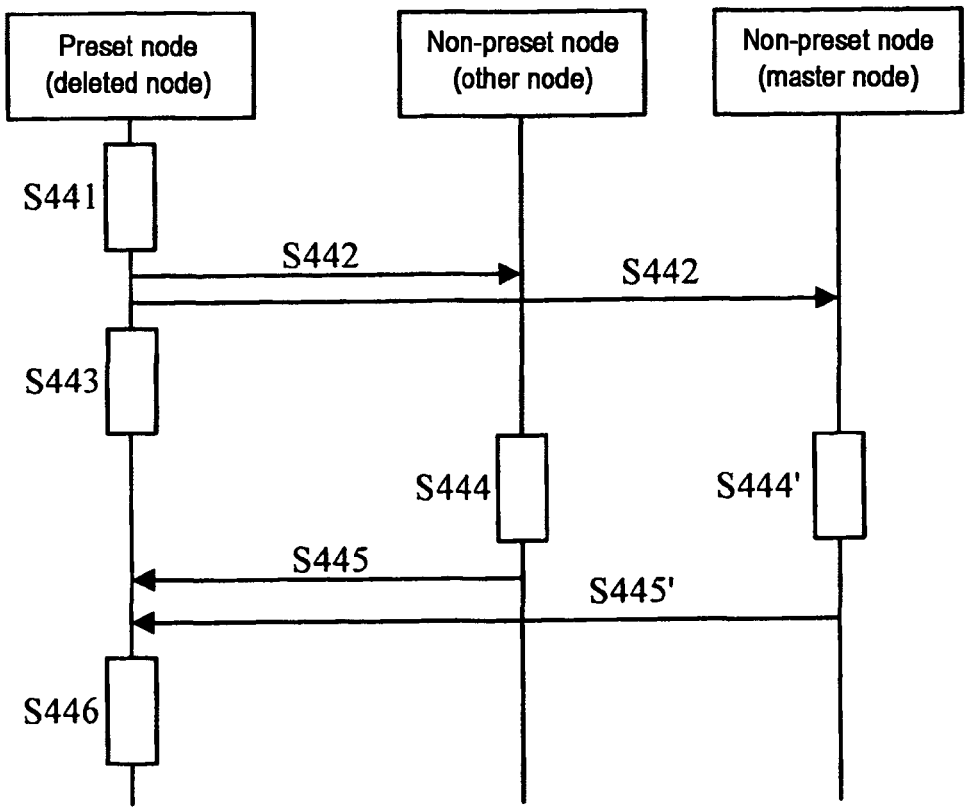
FIG. 8 shows a timing diagram of updating configuration by preset nodes within an anycast group in case of nodes being deleted from the anycast group according to the second embodiment of the present invention, wherein the preset nodes are the deleted nodes.

With reference to FIG. 8, it shows a timing diagram of updating configuration performed by preset nodes within an anycast group in case of deleting a node from the anycast group according to the second embodiment of the present invention. In the present embodiment, the preset node is the deleted node. Similar to the above embodiment as shown in FIG. 7, the master node from the slave nodes are differentiated in the anycast group. At this time, after the master node and the other nodes originally present in the anycast group receive the corresponding address configuration update message, step S444 and step S444' are respectively implemented. At step S444, on one hand, the master node needs to determine whether the relevant resource of the deleted node is released, and if it is not released, such relevant resource will be released; on the other hand, the master needs to delete the anycast group configuration information relevant to the deleted node within it, for example deleting the address information of the deleted node, which will not be detailed here; then step S445 is implemented. At step S444', other node deletes the anycast group configuration information related to the deleted node, for example deleting the address information of the deleted node, which can be understood and implemented by the skilled in the art and thus will be not detailed here; then step S445' is implemented. At step S445 and S445', each of the above non-preset nodes (including the master node and other nodes) returns a configuration result answer message to the preset node; then the preset node implements step S446, i.e. processing based on the above configuration result answer message, for example generating a report regarding this configuration report. Till now, this configuration process ends.

The skilled in the art would appreciate that during the process as shown in FIG. 8, after step S442, the deleted node also implements step S443, i.e. deleting the configuration information related to the anycast group within it, such that it does not belong to a member node of the anycast group any more. The skilled in the art would appreciate that the implementation order of the step S443 can be arranged reasonably based on different embodiments, which does not affect the substantive content of the present invention.

Still referring to FIG. 7 and FIG. 8, the skilled in the art would appreciate that the embodiments as shown in the above two figures and their relevant variations relate to respective processing flow of the master node, deleted slave node, and other non-deleted slave nodes in the case that the anycast group includes therein two different nodes: master node and slave nodes (for example in an anycast group composed of RP nodes in PIM-SM, the registration packet from a multicast source firstly reaches the node closest to the multicast source in the RP anycast group, and then is forwarded by the RP node to other RP nodes within the same anycast group. In this case, the RP node is the master node, and other nodes within the anycast group are slave nodes). In the case that there is no differentiation of master node from slave nodes within an anycast group, i.e. all nodes in the anycast group are peer nodes (for example between root domain servers forming the same anycast group), correspondingly there is no master node as shown in FIG. 7 and FIG. 8, and at this time if the processing flows relates to the deleted slave node and other non-deleted slave nodes, as described above, are still applicable, the skilled in the art can implement based on the above embodiments and their variations, which will not be detailed here.

Still referring to FIGS. 2, 5 to 7, the skilled in the art would appreciate that after implementing the above steps S401, S411, S421 and S431 respectively, the preset node still configures itself, such that the preset node also satisfies the configuration requirements of the anycast group, for example, it can be implemented with reference to the process of configuring the present node by the non-preset node as shown in FIG. 2. Further, the skilled in the art would appreciate that, the process of configuration a node itself may varies with the initial configuration and update configuration, etc, which can be implemented by the skilled in the art with reference to FIGS. 2 to 8, which will not be detailed here.

With reference to the above FIGS. 1 to 8, the non-preset nodes send a configuration result answer message to the preset node after configuring itself. The content of the answer message will vary with different processing conditions. In one embodiment, the answer message includes two circumstances: "configuration success" and "configuration failure", whereas in such embodiment, if the answer message is "configuration failure", it also contains the reason for configuration failure, for example in the present embodiment, it at least includes two reasons: "Invalid Configuration Address" and "Invalid ACN (address configuration notification) header". The skilled in the art would appreciate that in a different embodiment, the content of the answer message will vary, for example in a variation, it also includes information related to the answer message type, for example the answer message belongs to one of "initial" and "update" configurations.

On the other hand, after receiving the above configuration result answer messages, the preset node processes these answer messages, for example the above steps S405, S415, S425, S435, and S446. In a preferred embodiment, the preset node generates a copy of report on this configuration result based on these answer messages, for example the report includes information about which nodes are successfully configured and which nodes are invalidly configured (also including to the reason for invalid configuration). In another variation, the corresponding answer message will be processed in other ways, which will be detailed here. Further, the above report will be used by other network device or processing program or directly analyzed by the administrator, for example for analyzing the reason for invalid configuration to thereby initiate a configuration operation process again.

At the same time, the skilled in the art would appreciate that, at the above steps S405, S415, S425, S435 and S446, the preset node not only processes the above answer message, but also processes the circumstance of not receiving answer message. For example, in a preferred embodiment, after sending the address configuration message or the address configuration update message, the preset node starts a timer to each non-preset node, and if the answer message sent from the non-preset node is not received within a preset time, the preset node generates a report of "No Answer message Received" for the non-preset node. The skilled in the art would appreciate that this case can be processed separately from the above answer message, which does not affect the substantive content of the present invention.

In another variation, only in the case of successful configuration, will the non-preset nodes send an answer message to the preset node, and do not send any answer message in the case of invalid configuration. In such variation, as long as the preset node receives the answer message, it can know that the non-preset nodes are successfully configured without determining the content of the answer message, and if no answer message is received from the non-preset nodes, the preset node can know that the non-preset nodes are invalidly configured, and at this time, there are two possibilities for invalid configuration: firstly, the non-preset nodes receive the above address configuration message, but error occurs during the configuration process, which causes the invalid configuration, and secondly, the non-preset nodes fail to receive the above-mentioned address configuration message. The skilled in the art would appreciate that changes of the generation mechanism and confirmation mechanism of the answer message do not affect the substantive content of the present invention.

Still further referring to FIGS. 2, 3, 6, 7, and 8, the preset node can obtain the predetermined configuration address information in varieties of ways. In a preferred embodiment, the preset node provides an input interface, which allows the predetermined configuration address information is inputted or imported, for example the configuration information is manually inputted by the administrator, or imported through an anycast group member management protocol functional module, or imported through an anycast group member join control module. Whereas in a variation, the preset node sends a request to other network device, and obtains such predetermined configuration address information based on the requested result, which can be understood by the skilled in the art, and is thus not detailed here.

Further, the skilled in the art would appreciate that in the above embodiment, regardless of an address configuration message or address configuration update message sent by the preset node to non-preset nodes, or the configuration result answer message sent by non-preset nodes to the preset node, they all have sufficient security, for example these messages are under the protection of IP security solution. For example, in a PIM domain where all nodes are under the same management tool, an identical authentication mechanism parameter (including key) is applicable to all of the above messages within a PIM-SM (Protocol Independent Multicast-Sparse Mode) domain.

Figure 9:
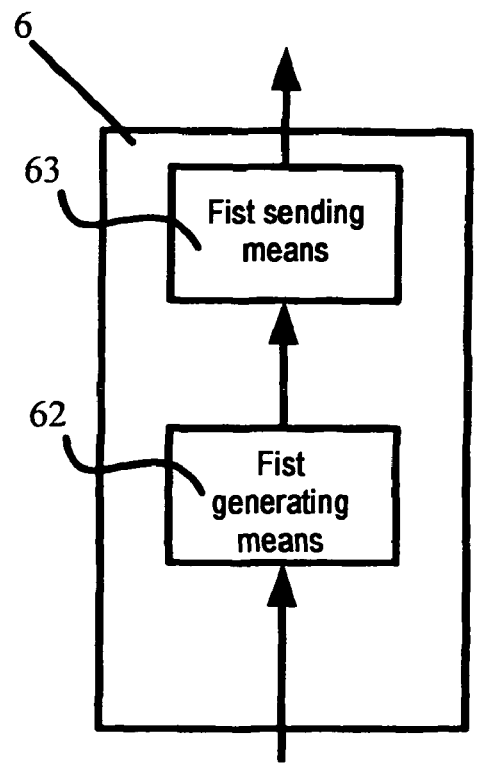
FIG. 9 shows a structural diagram of a control device for configuring non-preset nodes within the group in the preset nodes within an anycast group according to the third embodiment of the present invention.

With reference to FIG. 9, it shows a structural diagram of a control device for configuring non-preset nodes within an anycast group in the preset nodes within the group according to the third embodiment of the present invention; In the present embodiment, the control device 6 includes first generation means 62 and first sending means 63, wherein the first generation means 62 is connected to the first sending means 63. The first generating means 62 is arranged for generating one or more address configuration messages based on the predetermined configuration address information; and the first sending means 63 is arranged for sending to each of the non-preset nodes within the anycast group an address configuration message corresponding to the non-preset node. The first sending means 63 has an output interface for sending the address configuration information to the outside.

With reference to FIG. 9, the skilled in the art would appreciate that, in a variation similar to the above third embodiment, the first generation means 62 is also arranged for generating one or more address configuration update messages based on the above predetermined configuration address information which is for update configuration operation to the non-preset nodes within the anycast group upon completion of the initial configuration.

With reference to FIG. 9, the skilled in the art would appreciate that, the above address configuration message has varieties of implementation manners, for example in the above-described third embodiment, the address configuration message at least includes the group address of the anycast group and the address of each node within the anycast group. In a variation of the third embodiment, the address configuration message may also include other content, which will not be detailed here.

Similarly, the skilled in the art would appreciate that the above address configuration update message may be implemented in varieties of ways. For example, in an embodiment, the address configuration update message at least includes the group address of the anycast group, the address of each node before the anycast group is updated and updated information about the anycast group (for example, the address of the added node, the address of the deleted node, and the address of the updated node, etc.) Whereas in another variation, the address configuration message only includes the address configuration update message, and similarly the update message may include any one or more among the address of the added node, the address of the deleted node, and the address of the updated node. In still another variation, the address configuration message includes the group address of the anycast group and the updated (current) address of each node within the anycast group, for example in the case of deleting a node, the address configuration message does not include the information about the deleted member node. The skilled in the art would appreciate that, in the latest variation, an assistant control device in the non-preset node within the anycast group must compare the information of all nodes within the anycast group before update and the information of all nodes within the anycast group after update, in order to determine the updated content and further complete the update configuration operation.

Figure 10:
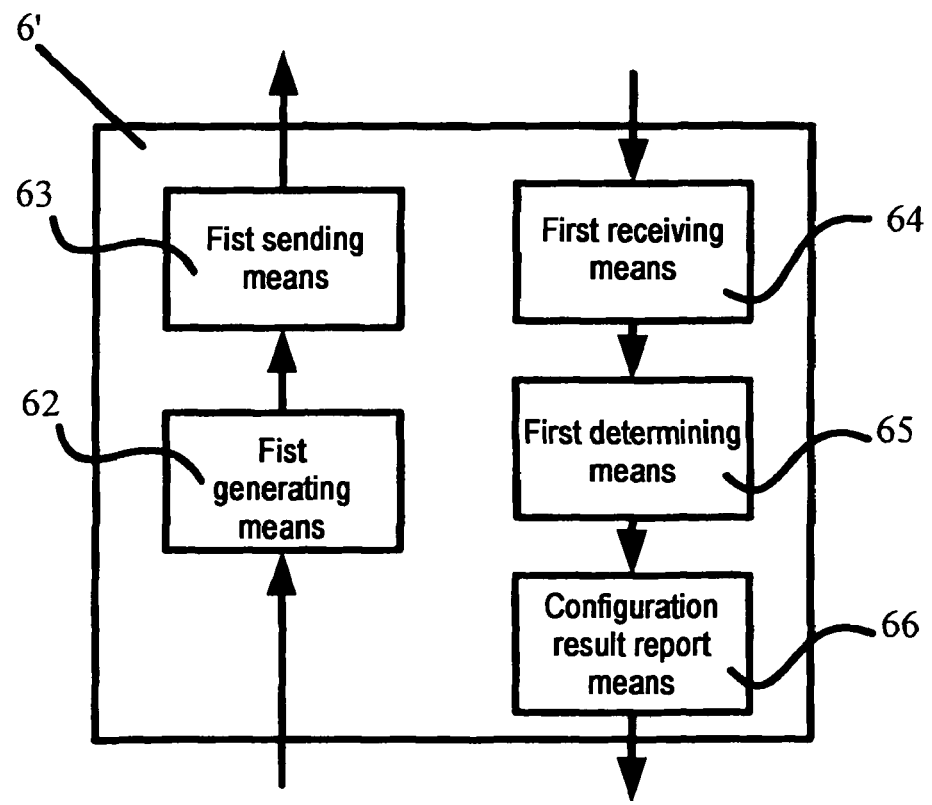
FIG. 10 shows a structural diagram of a control device in the preset nodes within an anycast group for configuring non-preset nodes within the group according to the fourth embodiment of the present invention.

With reference to FIG. 10, it shows a structural diagram of a control device for configuring non-preset nodes within the group in the preset nodes within an anycast group according to the fourth embodiment of the present invention; What is different from the third embodiment as shown in FIG. 9 is that the control means 6' also includes first receiving means 64, first determining means 65, and configuration result report means 66, wherein the first determining means 65 is connected to the first receiving means 64 and the configuration result report means 66, respectively. The first receiving means 64 is provided with an input interface for receiving messages from the outside, and the configuration result report means 66 is provided with an output interface for sending messages to outside of the control device 6'. The first receiving means 64 is arranged for receiving answer messages to the address configuration message or address configuration update message from non-preset nodes, wherein the answer message includes information about whether the configuration is successful; the first determining means 65 is arranged for determining whether the answer message received by the first receiving means 64 is the information of "successful configuration"; and the configuration result report means 66 is arranged for generating configuration failure report information when the answer message is not the information of "successful configuration".

The skilled in the art would appreciate that in a variation of the fourth embodiment, the first determining means 65 may not be provided, and at this time, regardless of the content in the answer messages sent by the non-preset nodes, the above configuration result report means 66 will generate a configuration result report based on such content, which can be implemented by the skilled in the art with reference to the prior art and is thus not detailed here.

Figure 11:
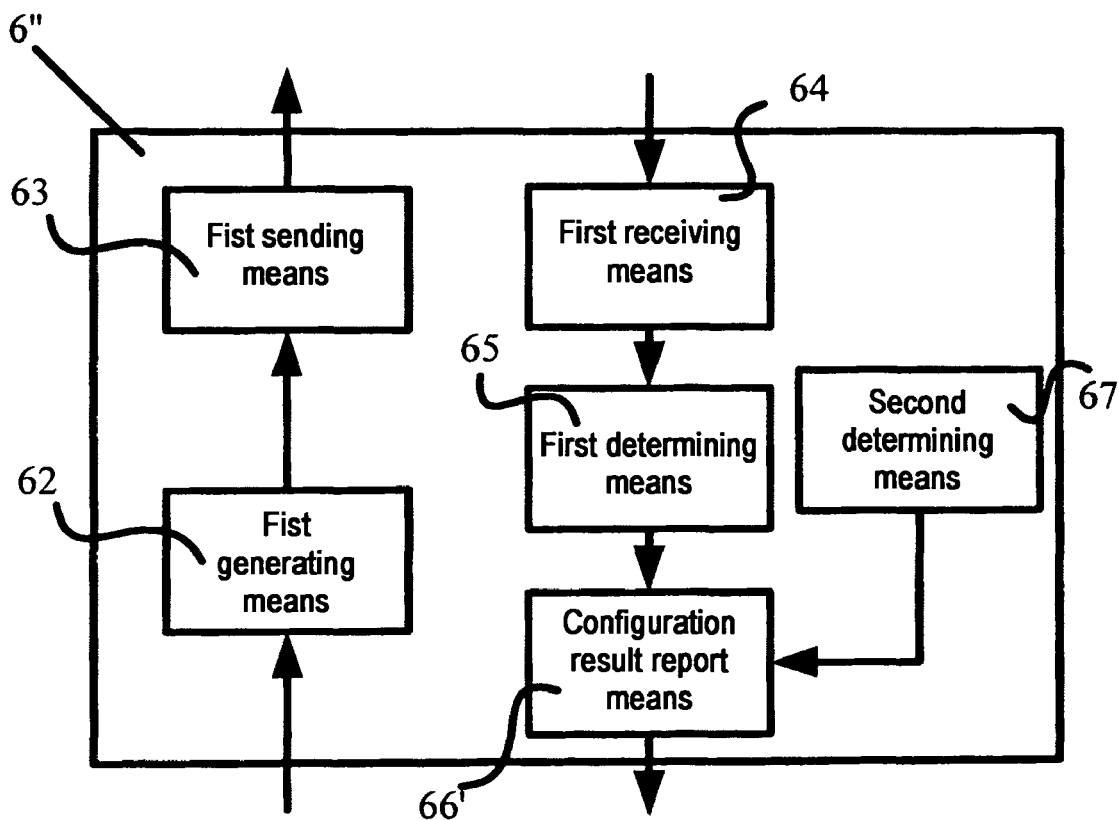
FIG. 11 shows a structural diagram of a control device in the preset nodes within an anycast group for configuring non-preset nodes within the group according to the five embodiment of the present invention.

With reference to FIG. 11, it shows a structural diagram of a control device for configuring non-preset nodes within the group in the preset nodes within an anycast group according to the fifth embodiment of the present invention. On the basis of the fourth embodiment as shown in FIG. 10, the control means 6" further includes second determination means 67 for determining whether the answer message sent from the non-preset nodes is received during a predetermined time period starting from the point of sending to each non-preset node an address configuration message or address configuration update message corresponding to the non-preset node. In the present embodiment, the second determining means 67 is connected to the configuration result report means 66' and outputs corresponding information to the configuration result report means 66 when not receiving the answer message from the non-preset nodes within the prescribed time period, and the configuration result report means 66' generates configuration failure report information for the non-preset nodes based on the information. In the present embodiment, after the first sending means 63 sends the address configuration message or the address configuration update message, the second determining means 67 starts a timer for each non-preset node, and determines whether it returns the answer message within the prescribed time for each non-preset node.

The skilled in the art would appreciate that in a variation of the above fifth embodiment, the configuration result report means 66' processes the information outputted by the first determining means 65 and the second determining means 67 respectively, and generates the configuration result report information based on all the processing results, wherein the information may include successful configuration information, or invalid configuration information, or "no response received within the prescribed time period" information. Based on the configuration result report information, the system can further determining the configuration result and perform other processing, for example reconfiguring upon the invalid configuration information. Of course, in a variation, the information outputted by the above two determining means can be uniformly processed.

Figure 12:
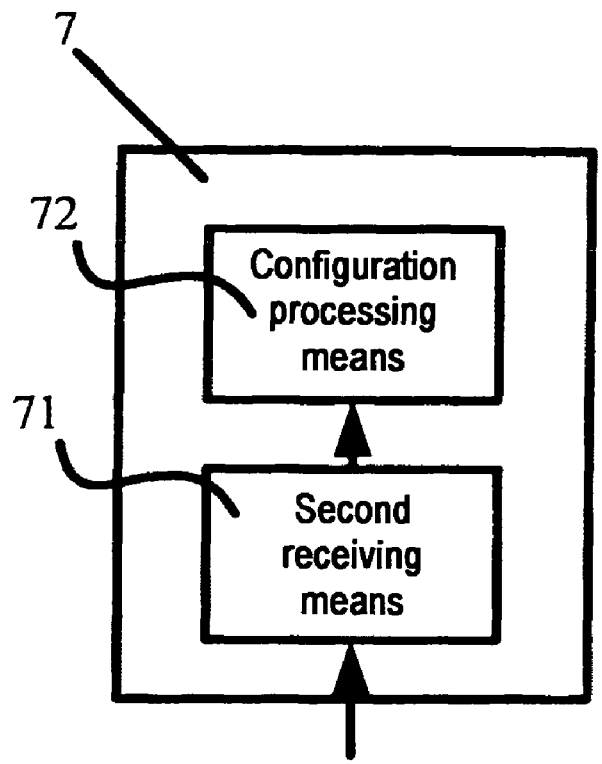
FIG. 12 shows a structural diagram of an assistant control device for assistant configuration of non-preset nodes within an anycast group according to the third embodiment of the present invention.

With reference to FIG. 12, it shows a structural diagram of an assistant control device for assistant configuration of non-preset nodes within an anycast group according to the third embodiment of the present invention. The assistant control means 7 comprises second receiving means 71 and configuration processing means 72 which are interconnected. The second receiving means 71 is provided with an input interface, for receiving messages from outside of the assistant control means 7. The second receiving means 71 is for receiving the address configuration message or address configuration update message from the preset node; the configuration processing means 72 is arranged for configuring the present node based on the address configuration address or address configuration update message. With reference to FIGS. 2, 5 to 8, it can be understood that the preset node sends the address configuration message or address configuration update message by means of the control device 6, whereas the non-preset nodes perform configuration according to such message by means of the assistant control device 7. Similarly, with reference to the description on FIGS. 1 to 11, the skilled in the art can further understand the specific processing processes of the second receiving means 71 and the configuration processing means 72, which will not be detailed here.

Figure 13:
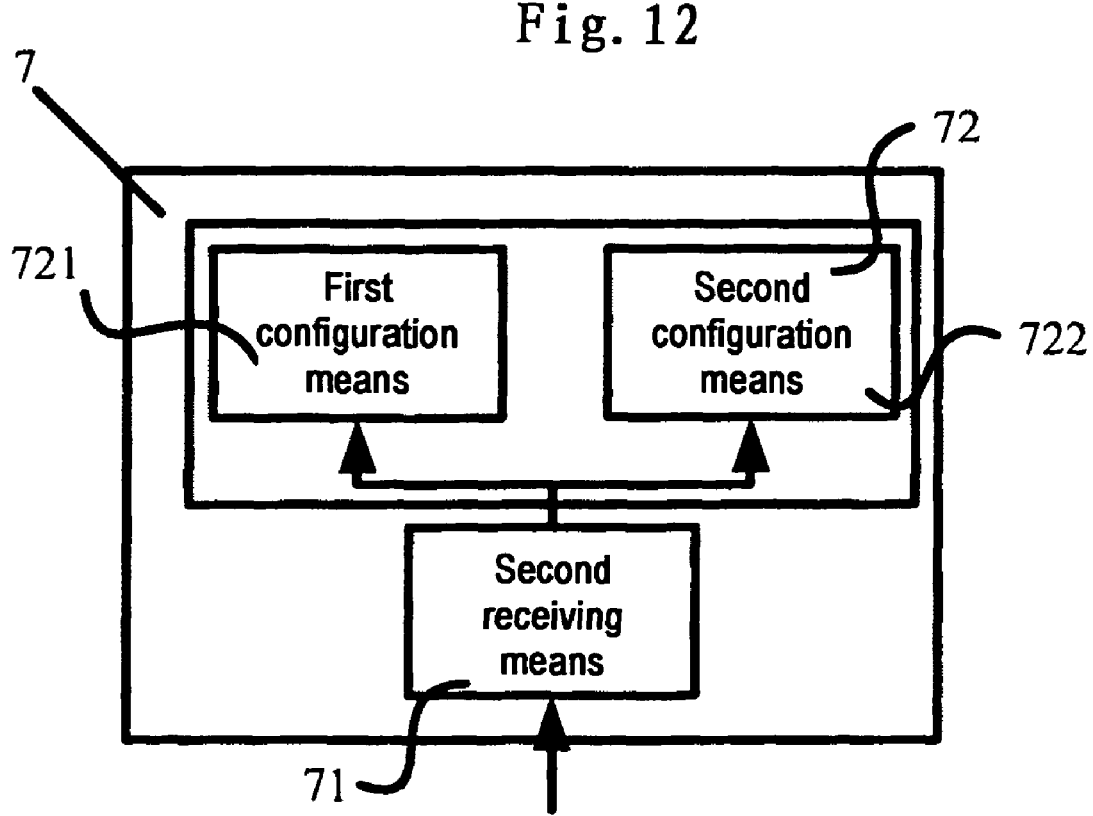
FIG. 13 shows a structural diagram of an assistant control device for assistant configuration of non-preset nodes within an anycast group according to the fourth embodiment of the present invention.

With reference to FIG. 13, it shows a structural diagram of an assistant control device for assistant configuration of non-preset nodes within an anycast group according to the fourth embodiment of the present invention. In the present embodiment, the above configuration processing means 72 comprises two means: first configuration means 721 and second configuration means 722. The first configuration means 721 is arranged for saving the addresses for all nodes other than the present node within the anycast group to communicate with the present node, as contained in the address configuration message, to be correlated with the group address of the anycast group contained in the address configuration message. The second configuration means 722 is arranged for update configuration of the present node based on the address configuration update message. Since the means 721 and 722 are connected to the second receiving means 71, respectively, in the present embodiment, the second receiving means 71 determines whether to send the received message to the means 721 or 722 for processing corresponding means.

With reference to FIG. 13, the skilled in the art would appreciate that, in a variation of the present embodiment, before saving the address information (the addresses of all other nodes than the present node in the anycast group for communication with the present node, and the group address of the anycast group), the first configuration means 721 also performs validity check operation to the address configuration message, for example checking whether the values of each domain in the ACN header is valid, and checking whether the type and range of the address contained in the address configuration message is valid, etc. The skilled in the art would further appreciate that, a separate validity check means 7211 can be provided to complete such check operation, and correspondingly a configuration means 7212 is used to complete the save operation as performed by the first configuration means 721 in the embodiment of FIG. 13; or such check operation and save operation can be directly implemented by the first configuration means 721 in the embodiment of FIG. 13, which does not affect the substantive content of the present invention. Similarly, the non-preset nodes as shown in FIGS. 2, and 5-8 can also implement the corresponding validity check step. Meanwhile, the skilled in the art would also appreciate that the second configuration means 722 as shown in FIG. 13 can also similarly implement the validity check operation for the address configuration update message.

With reference to the previous FIGS. 1 to 8, it can be understood that the first configuration means 721 can be used to complete the anycast initial configuration process, but in some variation, it can also be used for complete the update configuration process, for example when adding nodes or only updating the original address information of some nodes (not deleting the nodes) and the address configuration update message includes the address information of all nodes after update, the above first configuration means 721 can complete the update configuration process of the anycast according to the initial configuration manner. The second configuration means 722 is arranged for completing the update configuration process for the anycast group. In an embodiment, the address configuration update information sets separately the update information, for example in case of only including the information related to the added nodes, the update configuration operation can be directly completed only based on the update information. In another embodiment, the address configuration update message does not set the update information separately, thus it requires the second configuration means 722 to make determination before completing the update configuration operation, which can be understood by the skilled in the art, and is thus not detailed here.

Figure 14:
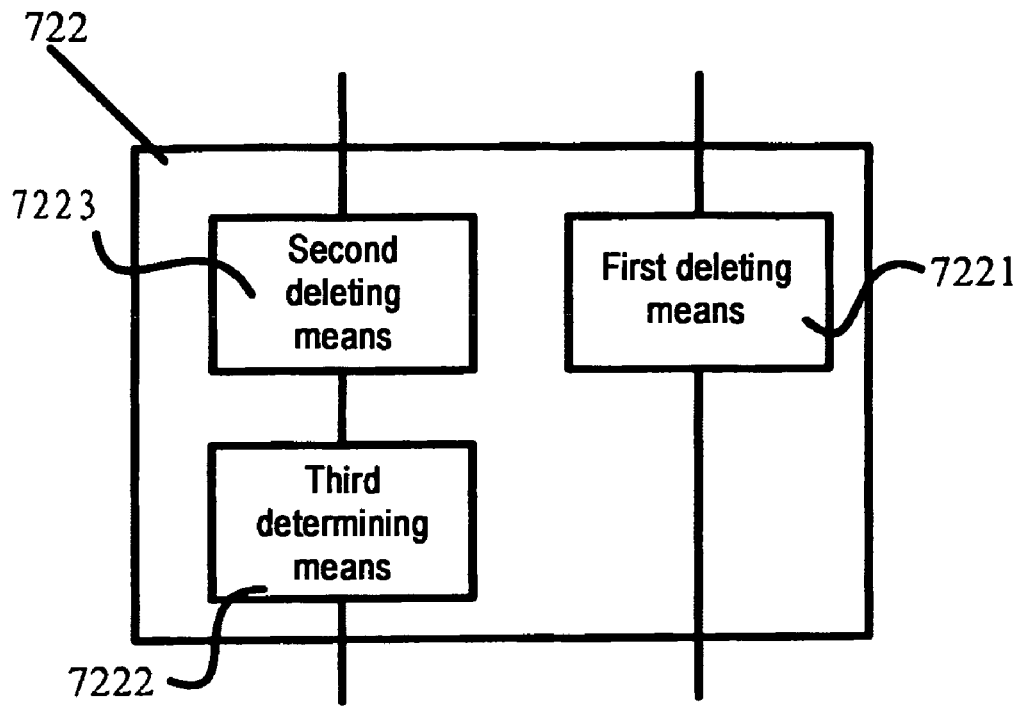
FIG. 14 shows a structural diagram of an assistant control device as shown in FIG. 13 according to an embodiment of the present invention.

With reference to FIG. 14, it shows a structural diagram of the second configuration means of the assistant control device as shown in FIG. 13 according to an embodiment of the present invention. In the present embodiment, the second configuration means 722 comprises first deleting means 7221, third determining means 7222, and second deleting means 7223, wherein the third determining means 7222 and the second deleting means 7223 are interconnected. The first deleting means 7221 is arranged for deleting the configuration information related to the anycast group in the present node, and by operation of the means 7221, the network device where the second configuration means 722 is disposed is enabled to delete the deleted node from the anycast group. The third determining means 7222 is arranged for determining whether the resource corresponding to the deleted node is released based on the information of the deleted node in the anycast group in the address configuration message or based on the information of the deleted node in the address configuration update message; the second deleting means 7223 is arranged for releasing the resource when the resource corresponding to the deleted node is not released (for example deleting the corresponding timer). The skilled in the art would appreciate that the third determining means 7222 and the second deleting means 7223 cooperate to implement the operation of deleting configuration information related to other member node when the network device where the second configuration means 722 is disposed is a master node in an anycast group. Based on the protocol, it can be understood that the master node can control the communication of other node with the outside of the anycast by means of the above resource (for example a timer), thus the resource should be released when the deleted node exits from the anycast group.

The skilled in the art would appreciate that, in a variation of the embodiment shown in FIG. 14, it may not include the third determining means 7222 and the second deleting means 7223, but such embodiment is not applicable to the case that the network device where the second configuration device 722 is disposed is a master node. Such a case that network device is not a master node can have the following circumstances: the anycast group per se does not differentiate the master node from the slave nodes, or the anycast group per se differentiates the master node from the slave nodes, but the network device is a slave node, which can be understood and implemented by the skilled in the art with reference to the description on FIGS. 7 and 8 and is thus not detailed here.

Figure 15:
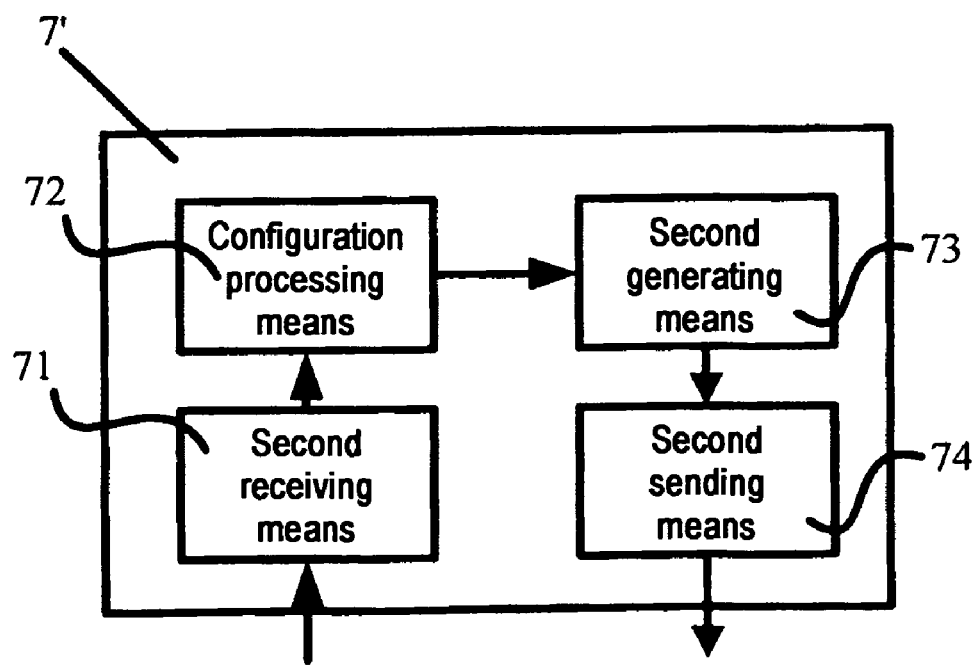
FIG. 15 shows a structural diagram of an assistant control device for assistant configuration of non-preset nodes within an anycast group according to the fifth embodiment of the present invention.

With reference to FIG. 15, it shows a structural diagram of an assistant control device for assistant configuration of non-preset nodes within an anycast group according to the fifth embodiment of the present invention. In the present embodiment, the assistant control device 7' further includes second generating means 73 and second sending means 74 based on the embodiment as shown in FIG. 12, wherein the second generating means 73 is connected to both the configuration processing means 72 and the second sending means 74. The second generating means 73 is arranged for generating an answer message based on the configuration result; the second sending means 74 is arranged for sending the answer message to the preset node. Based on the previously described content, the skilled in the art would appreciate that the answer message may include information of "successful configuration" or "invalid configuration", which will not be detailed here.

Still referring to FIGS. 9 to 15, in still another embodiment of the present invention, a node in a communication network is further provided. The node comprises the control device 6 or the control device 6' or the control device 6'' as described in any of the embodiments of FIGS. 9, 10, 11, and the assistant control device 7 or assistant control device 7' as described in any of the embodiments as shown in FIGS. 12, 13, 14, 15. The node can be a preset node to configure all non-preset nodes, or a non-preset node to configure the node itself based on the configuration information from the preset node. The skilled in the art would appreciate that in an embodiment, the node can be a router, and in another embodiment, such node can also be other device, for example a switch device or a host machine, etc.

The preferred embodiments of the present invention are described above. It should be understood that the present invention is not limited to the above special embodiments, and the skilled in the may make various alterations or modifications within the scope of the appended claims.

The invention claimed is:

1. A method for configuring, in a preset node within an anycast group, non-preset nodes within the anycast group, comprising:

performing address configuration automatically to the non-preset nodes within the anycast group based on configuration address information, said performing address configuration comprising:

a. generating one or more address configuration messages based on the configuration address information;

b. sending to each of the non-preset nodes within the anycast group an address configuration message corresponding to the non-preset node, said address configuration message comprising:

a group address of the anycast group; and addresses of each node of the anycast group, said step of performing address configuration further comprising:

receiving an answer message to the address configuration message or an address configuration update message from the non-preset nodes;

determining whether the answer message is "Successful Configuration" information; and generating invalid configuration report information if the answer message is not "Successful Configuration" information.

2. A method according to claim 1, wherein said step a comprises generating one or more address configuration update messages based on the configuration address information; and wherein said step b comprises sending, to each of the non-preset nodes within the anycast group, an address configuration update message corresponding to the non-preset node.

3. A method according to claim 1, wherein said performing address configuration automatically to the non-preset nodes within the anycast group based on the configuration address information further comprises:

determining whether the answer message sent from the non-preset nodes is received during the predetermined time period starting from sending to each of the non-preset nodes an address configuration message or an address configuration update message corresponding to the non-preset node;

generating invalid configuration report information corresponding to the non-preset node if the answer message is not received within said predetermined time period.

4. A method according to claim 2, wherein said address configuration update message at least includes one of:

address of an added node;

address of a deleted node; and address of an updated node.

5. A method according to claim 2, wherein said address configuration update message further includes:

the group address of the anycast group; and addresses of each node of the anycast group updated.

6. A control device for configuring, in a preset node within an anycast group, non-preset nodes within the anycast group, wherein an address configuration is automatically performed to the non-preset nodes within the group based on a configuration address information, comprising:

first generating means for generating one or more address configuration messages based on said predetermined configuration address information;

first sending means for sending to each of the non-preset nodes within the anycast group an address configuration message corresponding to the non-preset node, said address configuration message comprising:

a group address of the anycast group; and address of each node of the anycast group;

first receiving means for receiving an answer message to the address configuration message or an address configuration update message from the non-preset nodes;

first determining means for determining whether the answer message is "Successful Configuration" information; and configuration result report means for generating invalid configuration report information if the answer message is not "Successful Configuration" information.

7. A control device according to claim 6, wherein the first generating means is further arranged for generating one or more address configuration update messages based on the configuration address information; and the first sending means is arranged for sending to each of the non-preset nodes within the anycast group an address configuration update message corresponding to the non-preset node.

8. A control device according to claim 6, further comprising:

second determining means for determining whether the answer message sent from the non-preset nodes is received during the predetermined time period starting from sending to each of the non-preset nodes an address configuration message or an address configuration update message corresponding to the non-preset node, wherein said configuration result report means is further arranged for generating invalid configuration report information to the non-preset node when the answer message is not received.

9. A control device according to claim 7, wherein said address configuration update message at least includes one of:
 address of an added node;
 address of a deleted node; and
 address of an updated node.

10. A control device according to claim 7, wherein said address configuration update message further includes:
 the group address of the anycast group; and
 addresses of each node of the anycast group updated.

11. A method for assistant configuration of the non-preset nodes within an anycast group, comprising:
 automatically performing address configuration based on an address configuration message or address configuration update message from a preset node within the anycast group, said automatically performing address configuration comprising:
  i. receiving the address configuration message or address configuration update message from said preset node;
  ii. configuring the present node based on the address configuration message or address configuration update message, said address configuration message or address configuration update message comprising:
   a group address of the anycast group; and
   address of each node of the anycast group, said automatically performing address configuration further comprising:
  iii. generating an answer message based on the address configuration message;
  iv. sending the answer message to the preset node, wherein said step iii comprises:
   determining whether the configuration in said step ii is successful;
   generating a "Successful Configuration" answer message if the configuration in said step ii is successful; and
   generating an "Invalid Configuration" answer message containing a reason for invalid configuration if the configuration in said step ii is invalid.

12. A method according to claim 11, wherein said address configuration message at least includes:
 the group address of the anycast group; and
 addresses of each node of the anycast group.

13. A method according to claim 11, wherein said automatically performing address configuration comprises:
 saving the addresses for all nodes, including the preset node, other than the present node within the anycast group to communicate with the present node, as contained in the address configuration message, to be correlated with the group address of the anycast group contained in the address configuration message.

14. A method according to claim 11, wherein said address configuration update message at least includes one of:
 address of an added node;
 address of a deleted node; and
 address of an updated node.

15. A method according to claim 14, wherein said automatically performing address configuration comprises:

performing update configuration to the present node based on the address configuration update message.

16. A method according to claim 15, wherein when the present node is the node deleted from within the anycast group, said automatically performing address configuration comprises:
 deleting configuration information related to the anycast group in the present node.

17. A method according to claim 15, wherein when the present node is a master node of the anycast group, whereas the deleted node is a slave node, said automatically performing address configuration further comprises steps of:
 determining if the resource related to the deleted node in the present node is not released based on the information about the deleted node in the address configuration update message;
 releasing the resource related to the deleted node if said resource related to the deleted node is not released.

18. A method according to claim 17, wherein said resource related to the deleted node at least comprises any one of the following resources:
 timer;
 register; or
 memory space.

19. An assistant control device for assistant configuration of non-preset nodes within an anycast group, comprising:
 second receiving means for receiving an address configuration message or an address configuration update message from a preset node within the anycast group; and
 configuration processing means for configuring the present node based on the configuration address information, address configuration message or the address configuration update message, said address configuration message or said address configuration update message comprising:
  a group address of the anycast group; and
  address of each node of the anycast group;
 second generating means for generating an answer message based on the configuration result of said configuration processing means;
 second sending means for sending the answer message to the preset node, said second generating means further comprising:
  fourth determining means for determining whether configuration by said configuration processing means is successful; and
  answer message generating means for generating a "Successful Configuration" answer message when the configuration by said configuration processing means is successful, and for generating an "Invalid Configuration" answer message including a reason for invalid configuration when the configuration by said configuration processing means is invalid.

20. An assistant control device according to claim 19, wherein said configuration processing means comprises:
 first configuration means for saving the addresses for all nodes, including the preset node, other than the present node within the anycast group to communicate with the present node, as contained in the address configuration message, to be correlated with the group address of the anycast group contained in the address configuration message.

21. An assistant control device according to claim 19, wherein said address configuration update message at least includes one of:

address of an added node;
address of a deleted node; and
address of an updated node.

22. An assistant control device according to claim 19, wherein said address configuration message at least includes:
the group address of the anycast group; and
addresses of each node of the anycast group updated.

23. An assistant control device according to claim 21, wherein said configuration processing means further comprises:
second configuration means for performing update configuration of the present node based on the address configuration update message.

24. An assistant control device according to claim 23, wherein said second configuration means comprises:
first deleting means, for deleting the configuration information related to the anycast group in the present node when the present node is a node deleted from within the anycast group.

25. An assistant control device according to claim 23, wherein said second configuration means further comprises:
third determining means, for determining whether the resource related to the deleted node in the present node is released based on the information of the deleted node in the address configuration update message when said non-preset node is a master node of the anycast group while the deleted node is a slave node; and
second deleting means, for releasing the resource related to the deleted node when said resource related to the deleted node is not released.

26. An assistant control device according to claim 25, wherein said resource related to the deleted node at least comprises any one of the following resources:
timer;
register; or
memory space.

* * * * *